(12) United States Patent
Won

(10) Patent No.: US 12,008,249 B2
(45) Date of Patent: Jun. 11, 2024

(54) MEMORY SYSTEM AND METHOD OF PERFORMING BACKGROUND OPERATION

(71) Applicant: SK hynix Inc., Icheon-si (KR)

(72) Inventor: Yong Seok Won, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 93 days.

(21) Appl. No.: 17/568,068

(22) Filed: Jan. 4, 2022

(65) Prior Publication Data

US 2023/0051018 A1 Feb. 16, 2023

(30) Foreign Application Priority Data

Aug. 10, 2021 (KR) .......................... 10-2021-0105634

(51) Int. Cl.
*G06F 3/06* (2006.01)
*G06F 12/02* (2006.01)

(52) U.S. Cl.
CPC .......... *G06F 3/0635* (2013.01); *G06F 3/0619* (2013.01); *G06F 3/0659* (2013.01); *G06F 3/0679* (2013.01); *G06F 12/0253* (2013.01); *G06F 2212/7211* (2013.01)

(58) Field of Classification Search
CPC ......... G06F 12/0253; G06F 2212/7211; G06F 3/0619; G06F 3/0635; G06F 3/0659; G06F 3/0679; G06F 3/0482; G06F 3/0483; G06F 3/061; G06F 3/0634; G06F 3/0653; G06F 3/167
See application file for complete search history.

(56) References Cited

U.S. PATENT DOCUMENTS 11,347,637 B2 * 5/2022 Kanno ................ G06F 12/0246
2021/0073118 A1 * 3/2021 Masuo ................. G06F 3/0608

FOREIGN PATENT DOCUMENTS

KR 20170092538 A 8/2017
KR 101861184 B1 5/2018

* cited by examiner

*Primary Examiner* — Jane W Benner
(74) *Attorney, Agent, or Firm* — Perkins Coie LLP

(57) ABSTRACT

A memory controller, a memory system and a method of operating a memory controller controlling a memory device are described. The memory controller may include a workload manager in communication with the memory device in which data is written and is read, the workload manager configured to acquire an amount of write data written to the memory device during a preset reference time, calculate a workload parameter indicating a ratio of the amount of write data to a reference write amount, and store the workload parameter for the preset reference time, and a performance manager configured to control, based on the workload parameter, a certain background operation performed by the memory device during a period corresponding to the workload parameter.

14 Claims, 10 Drawing Sheets

FIG. 4

|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon |  |  |  |  |  |  |  |  |  |  |  |  |  |  |  |  |  |  |  |  |  |  |  |  |
| Tuse |  |  |  |  |  |  |  |  |  |  |  |  |  |  |  |  |  |  |  |  |  |  |  |  |
| Wed |  |  |  |  |  |  |  |  |  |  |  |  |  |  |  |  |  |  |  |  |  |  |  |  |
| Thurs |  |  |  |  |  |  |  |  |  |  |  |  |  |  |  |  |  |  |  |  |  |  |  |  |
| Fri |  |  |  |  |  |  |  |  |  |  |  |  |  |  |  |  |  |  |  |  |  |  |  |  |
| Sat |  |  |  |  |  |  |  |  |  |  |  |  |  |  |  |  |  |  |  |  |  |  |  |  |
| Sun |  |  |  |  |  |  |  |  |  |  |  |  |  |  |  |  |  |  |  |  |  |  |  |  |

FIG. 6

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | - | - | - | - | - | - | - | - | - | - | - | - | - | - | - | - | - | - | - | - | - | - | - | - |
| Tuse | - | - | - | - | - | - | - | - | - | - | - | - | - | - | - | - | - | - | - | - | - | - | - | - |
| Wed | - | - | - | - | - | - | - | - | - | - | - | - | - | - | - | - | - | - | - | - | - | - | - | - |
| Thurs | - | - | - | - | - | - | - | - | - | - | - | - | - | - | - | - | - | - | - | - | - | - | - | - |
| Fri | - | - | - | - | - | - | - | - | - | - | - | - | - | - | - | - | - | - | - | - | - | - | - | - |
| Sat | - | - | - | - | - | - | - | - | - | - | - | - | - | - | - | - | - | - | - | - | - | - | - | - |
| Sun | - | - | - | - | - | - | - | - | - | - | - | - | - | - | - | - | - | - | - | - | - | - | - | - |

FIG. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | | | | | | | | | | | | | | | |
| Tuse | | | | | | | | | | | | | | | | | | | | | | | | |
| Wed | | | | | | | | | | | | | | | | | | | | | | | | |
| Thurs | | | | | | | | | | | | | | | | | | | | | | | | |
| Fri | | | | | | | | | | | | | | | | | | | | | | | | |
| Sat | | | | | | | | | | | | | | | | | | | | | | | | |
| Sun | | | | | | | | | | | | | | | | | | | | | | | | |

MEMORY SYSTEM AND METHOD OF PERFORMING BACKGROUND OPERATION

CROSS-REFERENCE TO RELATED APPLICATION

This patent document claims priority to and benefits of the Korean patent application number 10-2021-0105634, filed on Aug. 10, 2021, which is incorporated herein by reference in its entirety.

TECHNICAL FIELD

The technology and implementations disclosed in this patent document generally relate to an electronic device, and more particularly to a memory system and a method of operating the memory system.

BACKGROUND

Memory systems refer to electronic components that are configured to store data based on a control of a host device, such as a computer or a smartphone. The memory system may include a memory device in which data is stored and a memory controller which controls the memory device. Such memory devices are classified into a volatile memory device and a nonvolatile memory device depending on its capability to hold stored data in the absence of power.

A volatile memory device may store data only when power is supplied. Thus, such a volatile memory device loses its data in the absence of power. Examples of the volatile memory device include a static random access memory (SRAM) and a dynamic random access memory (DRAM).

A nonvolatile memory device can retain its data in the absence of power. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

Various embodiments of the disclosed technology are directed to a memory system for improving the performance of a memory device and predicting the lifetime of the memory device, and to a method of operating the memory system.

In one aspect, a memory controller for controlling a memory device is provided. The memory controller may include a workload manager in communication with the memory device in which data is written and is read, the workload manager configured to acquire an amount of write data written to the memory device during a preset reference time, calculate a workload parameter indicating a ratio of the amount of write data to a reference write amount, and store the workload parameter for the preset reference time, and a performance manager configured to control, based on the workload parameter, a certain background operation performed by the memory device during a period corresponding to the workload parameter.

In another aspect, a memory system is provided. The memory system may include a memory device for which a reference amount of data is preset, and a memory controller configured to control the memory device based on workload parameters that represent usage levels of the memory device for the plurality of time slots, and the memory controller may include a workload manager configured to calculate the workload parameters based on data written to or read from the memory device for the plurality of time slots, and store the workload parameters respectively corresponding to the plurality of time slots, and a performance manager configured to schedule a certain background operation performed by the memory device without receiving and executing a command based on the workload parameters.

In another aspect, a method of operating a memory controller controlling a memory device is provided. The method may include generating a plurality of time slots, acquiring data amount information of a memory device based on data written to the memory device or read from the memory device, the data amount information corresponding to the plurality of time slots, calculating workload parameters indicating differences between the data amount information and a reference data amount that is preset for the memory device, storing the workload parameters respectively corresponding to the plurality of time slots, and controlling whether to perform a certain background operation of the memory device performed in each of the plurality of time slots based on the workload parameters.

BRIEF DESCRIPTION OF THE DRAWINGS

FIG. 4 is a diagram illustrating a method of storing workload parameters according to an embodiment of the disclosed technology.

FIG. 6 is a diagram illustrating a method of controlling a background operation of a memory device according to an embodiment of the disclosed technology.

FIG. 7 is a diagram illustrating a method of updating workload parameters according to an embodiment of the disclosed technology.

DETAILED DESCRIPTION

Specific structural or functional descriptions are provided with regard to the embodiments of the disclosed technology as examples only and thus should not be construed as limitations to the disclosed technology.

Figure 1:
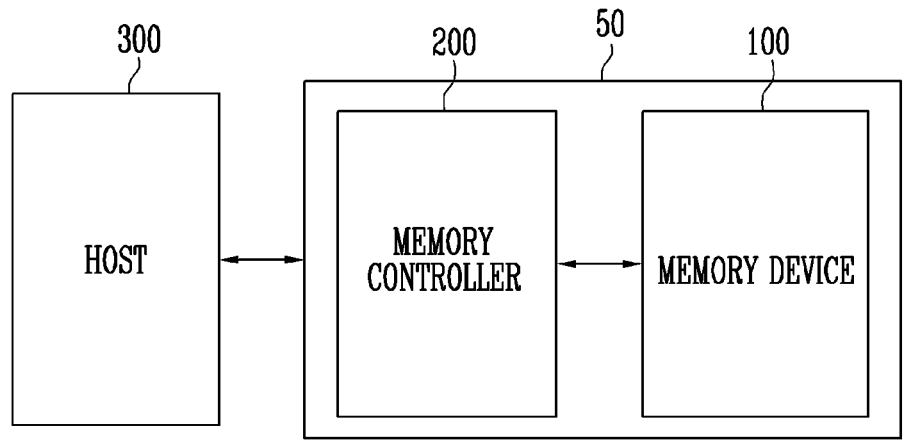
FIG. 1 is a diagram illustrating a memory system including a memory device according to an embodiment of the disclosed technology.

FIG. 1 is a diagram illustrating a memory system including a memory device according to an embodiment of the disclosed technology.

Referring to FIG. 1, a memory system 50 is a device for storing data and may include a memory device 100 and a memory controller 200 that is coupled to control an access by a host and an operation of the memory device. The memory system 50 may be a device which stores data based on the control of a host 300, such as a mobile phone, a smartphone, an MP3 player, a laptop computer, a desktop computer, a game console, a TV, a tablet PC, or an in-vehicle infotainment system.

The memory system 50 may be manufactured as any one of various types of memory systems depending on a host interface that is a scheme for communication with the host 300. For example, the memory system 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 50 may be manufactured in any one of various types of package forms. For example, the memory system 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the memory controller 200. The memory device 100 may include a memory cell array (not illustrated) including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array (not illustrated) may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may receive a command CMD and an address ADDR from the memory controller 200, and may access the area of the memory cell array, selected by the address. The memory device 100 may perform an operation indicated by the command CMD on the area selected by the address ADDR. For example, the memory device 100 may perform a program operation, a read operation, and an erase operation. During a program operation, the memory device 100 may store data in the area selected by the address ADDR. During a read operation, the memory device 100 may read data from the area selected by the address ADDR. During an erase operation, the memory device 100 may erase data stored in the area selected by the address ADDR.

In an embodiment, the memory device 100 may include a plurality of planes. Each plane may be a unit on which an operation can be independently performed. For example, the memory device 100 may include two, four or eight planes. The plurality of planes may independently and simultaneously perform a program operation, a read operation or an erase operation.

The memory controller 200 may control the overall operation of the memory system 50.

When power is applied to the memory system 50, the memory controller 200 may run firmware (FW). When the memory device 100 is a flash memory device, the firmware (FW) may include a host interface layer (HIL) which controls communication with the host 300, a flash translation layer (FTL) which controls communication between the host 300 and the memory device 100, and a flash interface layer (FIL) which controls communication with the memory device 100.

The memory controller 200 may receive write data and a logical block address (LBA) from the host 300, and may translate the logical block address (LBA) into a physical block address (PBA) indicating the address of memory cells which are included in the memory device 100 and in which data is to be stored. In the present specification, "Logical Block Address (LBA)" and "logical address" may be used to have the same meaning. In the present specification, "Physical Block Address (PBA)" and "physical address" may be used to have the same meaning.

The memory controller 200 may control the memory device 100 so that a program operation, a read operation or an erase operation is performed in response to a request received from the host 300. During a program operation, the memory controller 200 may provide a program command, a physical block address (PBA), and data to the memory device 100. During a read operation, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and program operations that are involved in performing wear leveling, read reclaim, garbage collection, etc.

In an embodiment, the memory controller 200 may control at least two memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other. Alternatively, the interleaving scheme may be a scheme in which two or more memory devices 100 are operated in parallel.

A buffer memory (not illustrated) may temporarily store data provided from the host 300, that is, data to be stored in the memory device 100, or may temporarily store data read from the memory device 100. In an embodiment, the buffer memory (not illustrated) may be a volatile memory device. For example, the buffer memory (not illustrated) may be a dynamic random access memory (DRAM) or a static random access memory (SRAM).

The host 300 may communicate with the memory system 50 using at least one of various communication methods such as universal serial bus (USB), Serial AT Attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
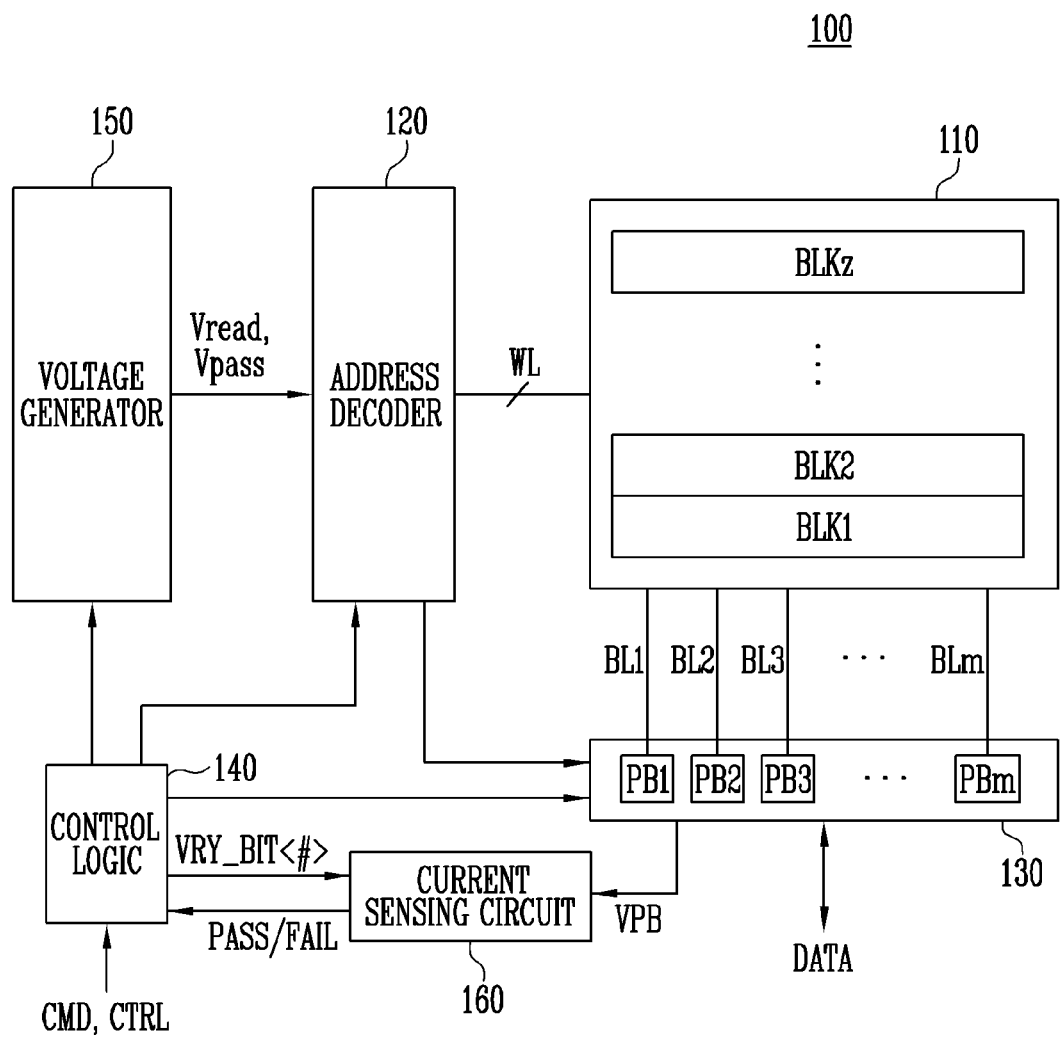
FIG. 2 is a diagram illustrating the memory device of FIG. 1.

FIG. 2 is a diagram illustrating the memory device of FIG. 1.

Referring to FIG. 2, the memory device 100 may include a memory cell array 110, an address decoder 120, a read and write circuit 130, a control logic 140, a voltage generator 150, and a current sensing circuit 160. The address decoder 120, the read and write circuit 130, the voltage generator 150, and the current sensing circuit 160 may be referred to as a "peripheral circuit" controlled by the control logic 140.

The memory cell array 110 may include a plurality of memory blocks BLK1 to BLKz. The memory blocks BLK1 to BLKz may be coupled to the address decoder 120 through word lines WL. The memory blocks BLK1 to BLKz may be coupled to the read and write circuit 130 through bit lines BL1 to BLm. Each of the memory blocks BLK1 to BLKz may include a plurality of memory cells. In an embodiment, the plurality of memory cells may be nonvolatile memory cells, and may be implemented as nonvolatile memory cells having a vertical channel structure. The memory cell array 110 may be implemented as a memory cell array having a two-dimensional (2D) structure. In an embodiment, the memory cell array 110 may be implemented as a memory cell array having a three-dimensional (3D) structure. Meanwhile, each of the memory cells included in the memory cell array 110 may store at least one bit of data. In an embodiment, each of the memory cells included in the memory cell array 110 may be a single-level cell (SLC), which stores one bit of data. In an embodiment, each of the memory cells included in the memory cell array 110 may be a multi-level cell (MLC), which stores two bits of data. In an embodiment, each of the memory cells included in the memory cell array 110 may be a triple-level cell (TLC), which stores three bits of data. In an embodiment, each of the memory cells included in the memory cell array 110 may be a quad-level cell (QLC), which stores four bits of data. In an embodiment, the memory cell array 110 may include a plurality of memory cells, each of which stores five or more bits of data.

The address decoder 120 may be coupled to the memory cell array 110 through the word lines WL. The address decoder 120 may be operated in response to the control of the control logic 140. The address decoder 120 may receive addresses through an input/output buffer (not illustrated) provided in the memory device 100.

The address decoder 120 may decode a block address, among the received addresses. The address decoder 120 may select at least one memory block based on the decoded block address. Further, during a read voltage apply operation in a read operation, the address decoder 120 may apply a read voltage Vread generated by the voltage generator 150, to a selected word line of a selected memory block and apply a pass voltage Vpass to the remaining word lines, i.e., unselected word lines. Further, during a program verify operation, the address decoder 120 may apply a verify voltage, generated by the voltage generator 150, to the selected word line of the selected memory block and apply the pass voltage Vpass to the remaining word lines, that is, the unselected word lines.

The address decoder 120 may decode a column address, among the received addresses. The address decoder 120 may transmit the decoded column address to the read and write circuit 130.

The read and program operations of the memory device 100 may each be performed on a page basis. Addresses received in response to requests for the read and program operations may include a block address, a row address, and a column address. The address decoder 120 may select one memory block and one word line in accordance with the block address and the row address. The column address may be decoded by the address decoder 120, and may then be provided to the read and write circuit 130. In the present specification, memory cells coupled to one word line may be referred to as a "physical page."

The read and write circuit 130 may include a plurality of page buffers PB1 to PBm. The read and write circuit 130 may be operated as a "read circuit" during a read operation on the memory cell array 110 and as a "write circuit" during a write operation. The plurality of page buffers PB1 to PBm may be coupled to the memory cell array 110 through the bit lines BL1 to BLm. In order to sense threshold voltages of the memory cells during a read operation and a program verify operation, each of the page buffers PB1 to PBm may sense, through a sensing node, a change in the amount of flowing current depending on the program state of a corresponding memory cell and latch the sensed change as sensing data while continuously supplying a sensing current to the bit lines coupled to the memory cells. The read and write circuit 130 may be operated in response to page buffer control signals output from the control logic 140. In the present specification, the write operation of the write circuit may be used as the same meaning as a program operation performed on selected memory cells.

During a read operation, the read and write circuit 130 may sense data stored in the memory cells and temporarily store read data, and may then output data DATA to the input/output buffer (not illustrated) of the memory device 100. In an embodiment, the read and write circuit 130 may include a column select circuit or others, as well as the page buffers (or page registers). In an embodiment of the disclosed technology, the read and write circuit 130 may be a page buffer.

The control logic 140 may be coupled to the address decoder 120, the read and write circuit 130, the voltage generator 150, and the current sensing circuit 160. The control logic 140 may receive a command CMD and a control signal CTRL through the input/output buffer (not illustrated) of the memory device 100. The control logic 140 may control the overall operation of the memory device 100 in response to the control signal CTRL. Also, the control logic 140 may output a control signal for controlling precharge potential levels at the sensing nodes of the plurality of page buffers PB1 to PBm. The control logic 140 may control the read and write circuit 130 to perform a read operation on the memory cell array 110.

The control logic 140 may determine whether a verify operation for a specific target program state has passed or failed in response to a pass or fail signal PASS or FAIL received from the current sensing circuit 160.

The voltage generator 150 may generate the read voltage Vread and the pass voltage Vpass required for a read operation in response to the control signal output from the control logic 140. The voltage generator 150 may include a plurality of pumping transistors which receive an internal supply voltage so as to generate a plurality of voltages having various voltage levels. The voltage generator 150 may generate the plurality of voltages by selectively enabling the plurality of pumping capacitors in response to the control of the control logic 140.

The current sensing circuit 160 may generate a reference current and a reference voltage in response to an enable bit VRY_BTI<#>received from the control logic 140 during a verify operation. The generated reference voltage may be compared with a sensing voltage VPB received from the page buffers PB1 to PBm included in the read and write circuit 130, or alternatively, the generated reference current may be compared with a sensing current received from the page buffers PB1 to PBm included in the read and write circuit 130, and thus the pass signal PASS or the fail signal FAIL may be output.

The address decoder 120, the read and write circuit 130, the voltage generator 150, and the current sensing circuit 160 may function as the "peripheral circuit" which performs a read operation, a write operation, and an erase operation on the memory cell array 110. The peripheral circuit may perform a read operation, a write operation, and an erase operation on the memory cell array 110 based on the control of the control logic 140.

Figure 3:
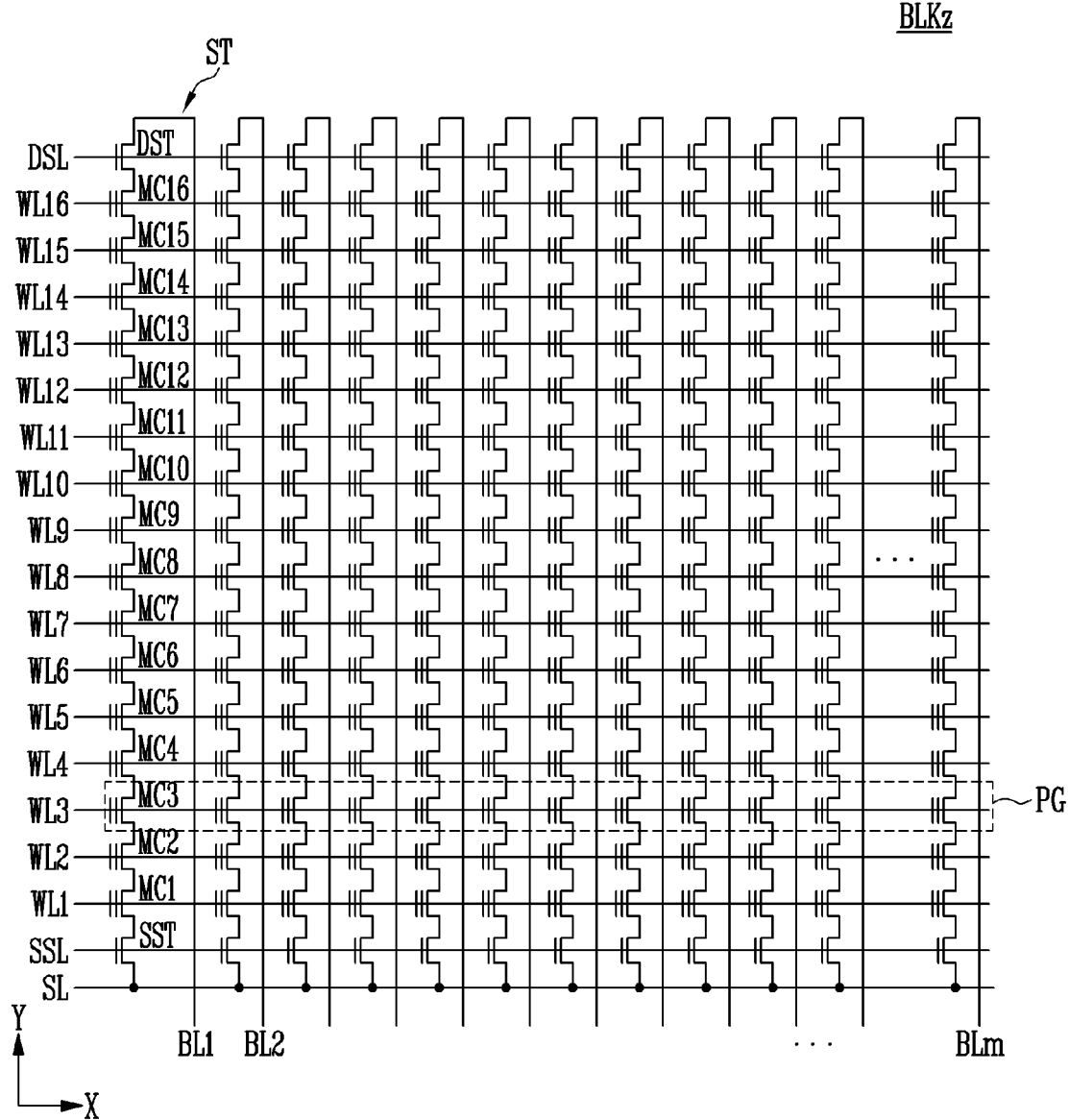
FIG. 3 is a diagram illustrating the structure of any one of memory blocks of FIG. 2.

FIG. 3 is a diagram illustrating the structure of any one of memory blocks of FIG. 2.

A memory block BLKz shows any one memory block BLKz, among the memory blocks BLK1 to BLKz of FIG. 2.

Referring to FIG. 3, a plurality of word lines arranged in parallel to each other may be coupled between a first select line and a second select line. Here, the first select line may be a source select line SSL, and the second select line may be a drain select line DSL. In detail, the memory block BLKz may include a plurality of strings ST coupled between bit lines BL1 to BLm and a source line SL. The bit lines BL1 to BLm may be coupled to the strings ST, respectively, and the source line SL may be coupled in common to the strings ST. Since the strings ST may be equally configured, the string ST coupled to the first bit line BL1 will be described in detail by way of example.

The string ST may include a source select transistor SST, a plurality of memory cells MC1 to MC16, and a drain select transistor DST which are coupled in series to each other between the source line SL and the first bit line BL1. A single string ST may include at least one source select transistor SST and at least one drain select transistor DST, and may include more memory cells than the memory cells MC1 to MC16 illustrated in the drawing.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells MC1 to MC16 may be coupled to a plurality of word lines WL1 to WL16, respectively. A group of memory cells coupled to the same word line, among the memory cells included in different strings ST, may be referred to as a 'physical page (PG)'. Therefore, the memory block BLKz may include a number of physical pages (PG) identical to the number of word lines WL1 to WL16.

One memory cell may store one bit of data. This cell is typically designated as a "single-level cell (SLC)". In this case, one physical page (PG) may store data corresponding to one logical page (LPG). The data corresponding to one logical page (LPG) may include a number of data bits identical to the number of cells included in one physical page (PG).

One memory cell may store two or more bits of data. In this case, one physical page (PG) may store data corresponding to two or more logical pages (LPG).

FIG. 4 is a diagram illustrating a workload parameter table that is used to store workload parameters according to an embodiment of the disclosed technology.

Referring to FIG. 4, workload parameters indicating workloads may be acquired. Each workload parameter indicates the extent or usage level how much a user uses a memory device. The workload parameters may correspond to a plurality of time slots, respectively. In FIG. 4, as an example, it may be assumed that workload parameters are acquired every hour and updated once a week. This assumption is the example only and the embodiment of the disclosed technology is not limited thereto.

In the example of FIG. 4, a horizontal axis may denote time, and a vertical axis may denote the day of the week. The workload parameter table 400 of FIG. 4 may store a workload parameter corresponding to a specific time slot with a certain duration on a specific day of the week.

As a specific example as shown in FIG. 4, the workload parameters may be acquired for every hour each day for one week. Accordingly, one day may be divided into 24 time slots with each slot being one hour for the 24 hours and for one week, 168 workload parameters may be acquired. The workload parameters may indicate the extents or the usage levels how much the user uses the memory device during the respective time slots with desired intervals or reference times. In the above specific example, there are 168 workload parameters for the week that correspond to 168 time slots, respectively.

In FIG. 4, the symbol '-' indicates that workload parameters are stored. The portion indicated by reference numeral 410 includes the workload parameters stored in the workload parameter table. Another portion indicated by reference numeral 420 includes blanks and indicates that the workload parameters are not stored. Specifically, since the symbol '-' is present from 0:00 a.m. to 15:00 p.m. on Monday, it can be considered that workload parameters are stored from 0:00 a.m. to 15:00 p.m. on Monday. It can be seen that, after 16:00 p.m. on Monday, the workload parameter table 400 is represented by blanks 420, and thus it can be seen that workload parameters are not yet stored. Once the user uses the memory device after 16:00 p.m. on Monday, workload parameters may be stored in the corresponding blanks of the workload parameter table 400.

The workload parameters may be acquired based on a default ratio between the amount of write data and the amount of read data of the memory device during a reference time, a duration of a time slot out of many time slots and the amounts of write data of the memory device respectively corresponding to the time slots. The default ratio is used to obtain a reference amount of write data, which is to be compared to the amount of write data that is written to the memory device by performing write operation(s). The reference amount of write data may be also referred to as the amount of write data corresponding to the default ratio. In the specific example in FIG. 4 when the workload parameters are acquired for every hour each day over a week, 168 workload parameters corresponding to 168 time slots are acquired, each time slot corresponding to one hour. For example, a workload parameter corresponding to a time slot starting at 9:00 a.m. on Monday may be calculated based on the default ratio between the amount of write data and the amount of read data of the memory device during the reference time and the amount of write data written to the memory device by performing a write operation of the memory device from 9:00 a.m. to 10:00 a.m. on Monday. The amount of write data corresponding to the default ratio may be compared with the amount of write data resulting from the write operation of the memory device performed from 9:00 a.m. to 10:00 a.m. on Monday.

The amount of write data corresponding to the default ratio may be greater than the amount of write data resulting from the write operation of the memory device performed on Monday from 9:00 a.m. to 10:00 a.m. The workload parameter for the time slot corresponding to Monday 9:00 a.m. may be the ratio between the amount of write data corresponding to the default ratio and the amount of write data resulting from the write operation of the memory device performed from 9:00 a.m. to 10:00 a.m. on Monday. In this case, the value of the workload parameter may be a value that is greater than 0 and less than 100.

The amount of write data corresponding to the default ratio may be less than or equal to the amount of write data resulting from the write operation of the memory device performed from 9:00 a.m. to 10:00 a.m. on Monday. The workload parameter for the time slot corresponding to the starting time at 9:00 a.m. on Monday may be a ratio between the amount of write data corresponding to the default ratio and the amount of write data resulting from the write operation of the memory device performed from 9:00 a.m. to 10:00 a.m. on Monday. In this case, the value of the workload parameter may be a value that is equal to or greater than 100.

In an embodiment of the disclosed technology, the value of the workload parameter may be represented by 1 byte. The workload parameters may be ratios between the amounts of write data corresponding to default ratios respectively corresponding to $2^8$ intervals and the amount of write data written in a specific time slot.

In an embodiment of the disclosed technology, the default ratio between the amount of write data and the amount of read data of the memory device during the reference time may be a preset value. The default ratio may be a value indicating the data throughput of the memory device by proportions of the amount of write data and the amount of read data.

In an embodiment of the disclosed technology, the amount of write data corresponding to a specific time slot may be acquired through Self-Monitoring, Analysis and Reporting Technology (S.M.A.R.T). Self-Monitoring, Analysis and Reporting Technology (S.M.A.R.T.) may be technology for checking the reliability of a memory device and monitoring and reporting the possibility of anticipated imminent failures. When failures are anticipated through Self-Monitoring, Analysis and Reporting Technology (S.M.A.R.T.), the user may prevent the loss of data from occurring due to unexpected problems by replacing the memory device.

Information acquired through Self-Monitoring, Analysis and Reporting Technology (S.M.A.R.T.) may vary depending on the usage pattern of the user who uses the memory device.

Figure 5:
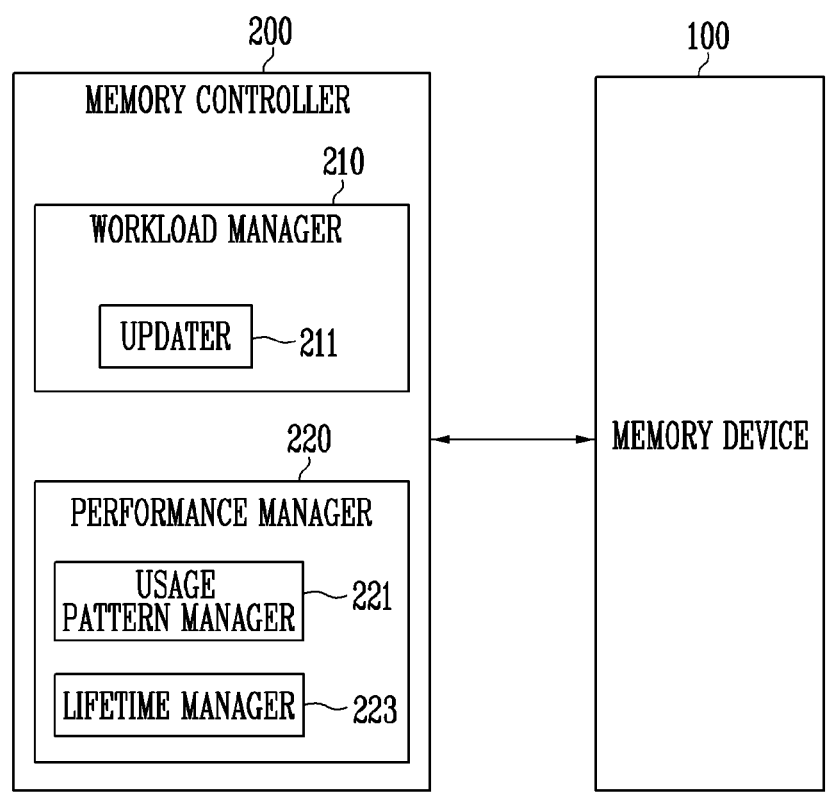
FIG. 5 is a block diagram illustrating a method of controlling a background operation of a memory device according to an embodiment of the disclosed technology.

FIG. 5 is a block diagram illustrating a method of controlling a background operation of a memory device according to an embodiment of the disclosed technology.

Referring to FIG. 5, a memory controller 200 may control, based on workload parameters, a memory device 100 for which a default ratio between the amount of write data and the amount of read data for a preset reference time is set. The memory controller 200 may include a workload manager 210, which calculates and stores workload parameters, and a performance manager 220, which controls one or more background operations of the memory device 100 based on the workload parameters. A background operation may refer to an operation performed within the memory device 100 without an intervention of a host by sending a command to the memory device from the host and without receiving and executing one or more commands from the host. Some examples of such a background operation include copying and processing data stored in one part of the memory device to another part, e.g., a background media scan operation, a wear leveling, a read reclaiming, and/or a garbage collection.

The workload manager 210 may acquire write amount information for the amount of write data of the memory device in each cycle corresponding to a preset reference time. The workload manager 210 may calculate each workload parameter indicating a workload, which is the extent or usage level how much the user uses the memory device. Each workload parameter may correspond to a reference time that is preset based on the write amount information and the default ratio. The workload manager 210 may store the workload parameter in each cycle.

In an embodiment of the disclosed technology, the workload manager 210 may calculate workload parameters by comparing the preset amount of write data of the memory device with the amount of data written in a write operation performed by the user. When the amount of data written in the write operation performed by the user is greater than the preset amount of write data, it may be determined that the workload of the user is pretty heavy. As the memory device 100 performs more write operations than those in a normal situation, the values of workload parameters may be larger. Each workload parameter may indicate how many write tasks are being performed by the user, compared to the preset amount of write data in the memory device. For example, each workload parameter may indicate whether the write tasks being performed by the memory device are small than the preset amount of write data.

The workload manager 210 may include an updater 211 for maintaining the number of workload parameters stored in the workload manager 210 at a uniform value. Thus, the fixed number of workload parameters are stored in the workload manager 210. The updater 211 may change a first workload parameter corresponding to a specific time, among the workload parameters stored in the workload manager, depending on a second workload parameter calculated after a preset time has elapsed. The updater 211 may replace the first workload parameter with the second workload parameter. Here, the number of workload parameters stored in the workload manager 210 may remain uniform. For example, even if the user uses the memory device 100 for longer than one week, the number of workload parameters stored in the workload manager 210 may remain at 168.

In an embodiment of the disclosed technology, the updater 211 may replace the first workload parameter with the average of the first workload parameter and the second workload parameter. The usage pattern of the user may be reflected in the workload parameters stored in the workload manager 210. Similarly, even if the user uses the memory device 100 longer than one week, the number of workload parameters stored in the workload manager 210 may remain as 168.

The performance manager 220 may control the background operation of the memory device during cycles corresponding to workload parameters based on the workload parameters. The performance manager 220 may limit the background operation during a period determined based on the workload parameters. For example, the performance manager 220 may limit the background operation of the memory device during a period corresponding to a workload parameter equal to or greater than a preset reference value. Thus, during the period corresponding to the workload parameter equal to or greater than the preset reference value, the background operation may be not performed. The performance manager 220 may adjust the extent or level how much the background operation is limited in proportion to the values of workload parameters.

The performance manager 220 may further include a usage pattern manager 221, which generates the usage pattern of the user based on the workload parameters, and a lifetime manager 223, which calculates the lifetime of the memory device. The usage pattern manager 221 may determine a first period corresponding to a workload parameter equal to or greater than the preset reference value. The usage pattern manager 221 may limit the background operation of the memory device 100 during the first period. The usage pattern manager 221 may determine a second period corresponding to a workload parameter less than the preset reference value. The usage pattern manager 221 may perform control such that the background operation of the memory device 100, which is limited during the first period, is performed during the second period.

Since the workload of the user is large in the first period, the usage pattern manager 221 may limit the background operation of the memory device 100 so as to improve the quality of service (QoS) provided to the user. The limited background operation of the memory device 100 may be performed during the second period, in which the workload of the user is smaller.

The usage pattern manager 221 may change the first period or the second period in accordance with the workload parameter changed by the updater 211. In an embodiment of the present disclosure, the updater 211 may change the workload parameter for each reference time, and thus the usage pattern manager 221 may change the first period or the second period for each reference time.

The usage pattern manager 221 may model the usage pattern of the user based on workload parameters. For example, it may be assumed that the user routinely uses the memory device 100 on weekdays (from Monday to Friday) from 9:00 a.m. to 19:00 p.m. The amount of write data obtained while the user routinely uses the memory device 100 may be greater than the amount of write data corresponding to the default ratio of the memory device 100. The usage pattern manager 221 may set the first period to the time period during which the user routinely uses the memory device 100 in a week, and may limit or minimize the background operation of the memory device 100 during the first period. The usage pattern manager 221 may set the second period, during which the user hardly uses the memory device 100, and may perform control such that the background operation of the memory device 100 is performed during the second period.

In other embodiments of the disclosed technology, the usage pattern manager 221 may change a default ratio between the amount of write data and the amount of read data of the memory device based on the workload parameters. The usage pattern manager 221 may determine, based on the workload parameters, that the amount of write data by the user continuously increases during a preset time. In this case, the usage pattern manager 221 may change the default ratio. In some implementations, the usage pattern manager 221 may decrease the default ratio even when the amount of write data by the user continuously decreases during the preset time.

The lifetime manager 223 may predict the amount of write data by the user based on the workload parameters, and may calculate the lifetime of the memory device. The lifetime manager 223 may predict the amount of write data on a reference time basis. The lifetime manager 223 may calculate the lifetime of the memory device as a multiple of the reference time. In accordance with an embodiment of the disclosed technology, the lifetime of the memory device 100 may be predicted on a time basis.

In accordance with other embodiments of the disclosed technology, the memory controller 200 may generate a plurality of time slots by dividing the preset time by the reference time. The workload manager 210 may acquire write amount information for the amounts of write data of the memory device respectively corresponding to the plurality of time slots. The workload manager 210 may calculate respective workload parameters based on the write amount information and the default ratio. The workload manager 210 may store the workload parameters. At this time, the workload parameters may respectively indicate workloads, each of which is the extent to which the user uses the memory device, depending on the plurality of time slots. The performance manager 220 may control the background operation of the memory device during periods respectively corresponding to the plurality of time slots based on the workload parameters.

FIG. 6 is a diagram illustrating a method of controlling a background operation of a memory device according to an embodiment of the disclosed technology.

Referring to FIG. 6, the case where all workload parameters are stored in a workload parameter table 600 is illustrated. Similar to FIG. 4, FIG. 6 illustrates the case where one week is divided into units of one hour and where workload parameters are stored during respective time units.

In FIG. 6, it may be assumed that the user continuously uses the memory device 100 on weekdays (from Monday to Friday) from 9:00 a.m. to 19:00 p.m., while the user rarely uses the memory device 100 from 19:00 p.m. to 8:00 a.m. on the next day.

The performance manager 220 may control the background operation of the memory device 100 every hour based on the workload parameters stored in the workload parameter table 600. Since the user continuously uses the memory device 100 on weekdays (from Monday to Friday) from 9:00 a.m. to 19:00 p.m., the values of workload parameters in time slots 610 corresponding to a period from 9:00 a.m. to 19:00 p.m. on weekdays (from Monday to Friday) may be higher than a preset reference value. In contrast, workload parameters in time slots 620 and 630 corresponding to a period from 19:00 p.m. on each day of the weekday (from Monday to Friday) to 8:00 a.m. on the next day may be less than the preset reference value. The performance manager 220 may control the background operation of the memory device 100 based on the workload parameters after the workload parameters are stored.

For example, the performance manager 220 may increase the background operation, performed in the time slots 620 corresponding to a period from 0:00 a.m. to 8:00 a.m. on Monday, depending on the values of the stored workload parameters. The performance manager 220 may limit the background operation in the time slots 610 corresponding to a period from 9:00 a.m. to 19:00 p.m. on Monday. The performance manager 220 may suspend the performance of the background operation or reduce the proportion of the background operation to be performed depending on the values of the workload parameters. Thereafter, the performance manager 220 may again increase the background operation in the time slots 630 corresponding to a period from 19:00 p.m. to 24:00 p.m. on Monday.

The usage pattern manager 221 may determine a plurality of time slots to be the first period and the second period based on the preset reference value and the workload parameters. The first period may be a period during which the values of the workload parameters corresponding to time slots are equal to or greater than the reference value. The second period may be a period during which the values of the workload parameters corresponding to time slots are less than the reference value. That is, the time slots 610 of FIG. 6 may be the first period. The time slots 620 and 630 of FIG. 6 may be the second period.

Although, in FIG. 6, periods for the usage pattern are divided only into the first period and the second period for convenience of description, the embodiment of the present disclosure is not limited thereto. In other embodiments of the present disclosure, the first period may also be divided into a plurality of periods depending on the workload parameters. For example, time slots corresponding to the first period may be divided into a period in which performance of the background operation is suspended and a period in which the proportion of the background operation that is performed is reduced.

In other embodiments of the present disclosure, the updater 211 may change workload parameters in the time slots corresponding to the first period to workload parameters calculated after a preset time has elapsed. For example, the workload parameters in the time slots corresponding to the first period in one week may be changed to the average value of the existing workload parameters and the newly calculated workload parameters. In contrast, the workload parameters in time slots corresponding to the second period may be replaced with newly calculated workload parameters.

In an embodiment of the present disclosure, the lifetime manager 223 may predict the amount of write data by the user based on the workload parameters, and may calculate the lifetime of the memory device. The lifetime manager 223 may calculate the amount of write data resulting from the write operation to be performed for one next week, based on the workload parameters. The lifetime manager 223 may predict the lifetime of the memory device 100 based on the fact that the amount of write data used in the past by the user will be equally used in the future. In response to a change in the workload parameters made by the updater 211, the lifetime of the memory device 100 predicted by the lifetime manager 223 may be changed. The lifetime manager 223 may predict the lifetime of the memory device 100 as a multiple of a reference time unit.

FIG. 7 is a diagram illustrating a method of updating workload parameters according to an embodiment of the disclosed technology.

Referring to FIG. 7, existing workload parameters may be changed depending on workload parameters that are newly calculated after a preset time has elapsed. It may be assumed that a workload parameter table 700 of FIG. 7 is obtained by updating the workload parameter table 600 of FIG. 6. Cases 710 and 720 where the workload of the user increases from 22:00 p.m. every day to 2:00 a.m. on the next day may be assumed.

The performance manager 220 may control the memory device 100 based on the workload parameters stored in the workload parameter table 600 of FIG. 6 from 0:00 a.m. on Monday. However, since the workload of the user has increased (indicated by '710') from 0:00 a.m. to 2:00 a.m. on Monday, the updater 211 may replace the workload parameters in time slots corresponding to a period from 0:00 a.m. to 2:00 a.m. on Monday with newly calculated workload parameters. When a period from Monday 0:00 a.m. to Sunday 24:00 has elapsed, the updater 211 may change the workload parameter table 600 of FIG. 6 to the workload parameter table 700 of FIG. 7.

The updater 211 may change a first workload parameter corresponding to a specific time, among the workload parameters stored in the workload manager, depending on a second workload parameter calculated after a preset time has elapsed. The updater 211 may maintain the number of workload parameters stored in the workload manager 210 at a uniform value.

In an embodiment of the disclosed technology, the updater 211 may replace the first workload parameter with the second workload parameter. Even if a period during which the user uses the memory device 100 is increased, the number of workload parameters stored in the workload manager 210 may be maintained.

In other embodiments of the disclosed technology, the updater 211 may replace the first workload parameter with the average of the first workload parameter and the second workload parameter. Similarly, even if a period during which the user uses the memory device 100 is increased, the number of workload parameters stored in the workload manager 210 may be maintained. Here, the workloads of the user in previous cycles may be reflected in the workload parameters stored in the workload manager 210. As the period during which the user uses the memory device 100 is increased, the range of change in the values of the workload parameters may be decreased.

The usage pattern manager 221 may determine a first period or a second period based on the workload parameters changed by the updater 211. For example, the usage pattern manager 221 may determine time slots 610 corresponding to a period from 9:00 a.m. to 19:00 p.m. on weekdays (from Monday to Friday) and the time slots 710 and 720 corresponding to a period from 22:00 p.m. every day to 2:00 a.m. on the next day to be the first period. The performance manager 220 may control the background operation of the memory device 100 on the next week based on the workload parameter table 700.

When the usage pattern of the user changes, the workload parameters stored in the workload manager 210 have changed by the updater 211, and thus the usage pattern manager 221 may change the time slots corresponding to the first period or the second period with the lapse of the preset time.

In accordance with other embodiments of the disclosed technology, the workload parameters may be managed on a daily (1 day) basis, a weekly (1 week) basis, a monthly (30 days) basis or on a yearly (365 days) basis. For example, the workload manager 210 may manage the workload parameters on a daily basis. The workload manager 210 may divide one day in the units of hour, and may manage workload parameters corresponding to 24 time slots.

The workload manager 210 may manage the workload parameters on a monthly (30 days) basis. The workload manager 210 may manage the workload parameters by setting one day divided in units of one hour to a horizontal axis and by setting one month (30 days) divided in units of one day to a vertical axis. Assuming that the size of a workload parameter corresponding to one hour is 1 byte, the size of workload parameters corresponding to one month may be 720 bytes.

The workload manager 210 may manage the workload parameters on a yearly (365 days) basis. The workload manager 210 may manage the workload parameters by setting one day divided in units of one hour to a horizontal axis and by setting one year (365 days) divided into units of one day to a vertical axis. Assuming that the size of a workload parameter corresponding to one hour is 1 byte, the size of workload parameters corresponding to one year may be 8760 bytes.

In accordance with an embodiment of the present disclosure, memory capacity required to control the background operation of the memory device 100 in consideration of the usage pattern of the user may remain uniform without being increased.

Figure 8:
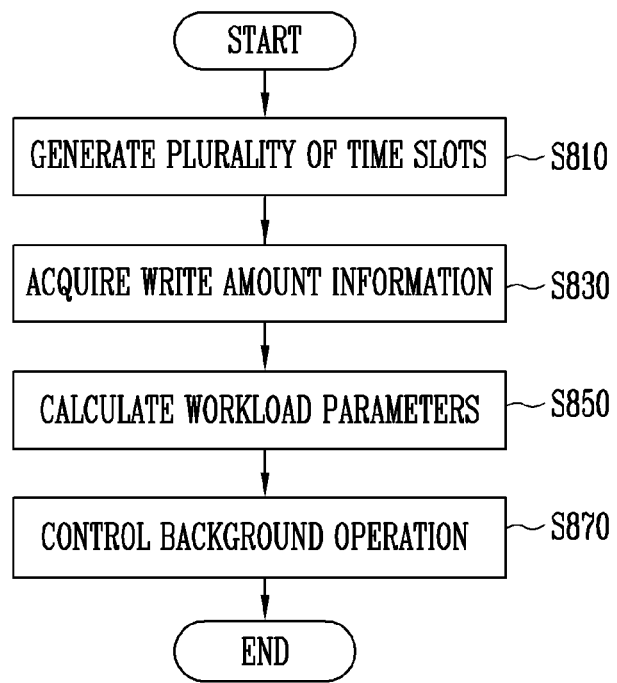
FIG. 8 is a flowchart illustrating a method of controlling a background operation of a memory device according to an embodiment of the disclosed technology.

FIG. 8 is a flowchart illustrating a method of controlling a background operation of a memory device according to an embodiment of the disclosed technology.

Referring to FIG. 8, the memory controller 200 may control a memory device 100 for which a default ratio between the amount of write data and the amount of read data for a reference time is set. The memory controller 200 may control a background operation of the memory device 100 in consideration of the workload of a user. Here, Quality of Service (QoS) provided to the user may be improved. The operations performed in FIG. 8 may correspond to the descriptions of FIGS. 4, 5, 6, and 7.

At step S810, the memory controller 200 may generate a plurality of time slots by dividing a preset time in units of the reference time. In an embodiment of the disclosed technology, the reference time is one hour, and the preset time may be one week. In other embodiments of the disclosed technology, the preset time may be one month or one year.

At step S830, the workload manager 210 may acquire write amount information for the amounts of write data of the memory device respectively corresponding to the plurality of time slots. In an embodiment of the disclosed technology, the write amount information may be acquired through Self-Monitoring, Analysis and Reporting Technology (S.M.A.R.T.). Self-Monitoring, Analysis and Reporting Technology (S.M.A.R.T.) may be technology for checking the reliability of a memory device and monitoring and reporting the possibility of anticipated imminent failures. When failures are anticipated through Self-Monitoring, Analysis and Reporting Technology (S.M.A.R.T.), the user may prevent the loss of data from occurring due to unexpected problems by replacing the memory device.

Information acquired through Self-Monitoring, Analysis and Reporting Technology (S.M.A.R.T.) may vary depending on the usage pattern of the user who uses the memory device.

In other embodiments of the disclosed technology, the workload manager 210 may acquire write amount information for the amount of write data of the memory device in each cycle corresponding to a preset reference time.

At step S850, the workload manager 210 may calculate respective workload parameters based on the write amount information and the default ratio. The workload manager 210 may store the workload parameters. At this time, the workload parameters may respectively indicate workloads, each of which is the extent to which the user uses the memory device, depending on the plurality of time slots.

In other embodiments of the disclosed technology, the workload manager 210 may calculate a workload parameter indicating a workload, which is the extent to which the user uses the memory device. The workload parameter may correspond to a reference time that is preset based on write amount information and the default ratio. The workload manager 210 may store the workload parameter in each cycle.

At step S870, the performance manager 220 may control the background operation of the memory device during periods respectively corresponding to the plurality of time slots based on the workload parameters. The usage pattern manager 221 may determine a first period corresponding to a workload parameter equal to or greater than the preset reference value. The usage pattern manager 221 may limit the background operation of the memory device 100 during the first period. The usage pattern manager 221 may determine a second period corresponding to a workload parameter less than the preset reference value. The usage pattern manager 221 may perform control such that the background operation of the memory device 100, which is limited during the first period, is performed during the second period.

Since the workload of the user is large in the first period, the usage pattern manager 221 may limit the background operation of the memory device 100 so as to improve the quality of service (QoS) provided to the user. The limited background operation of the memory device 100 may be performed during the second period in which the workload of the user is smaller.

The usage pattern manager 221 may change the first period or the second period in accordance with the workload parameter changed by the updater 211. In an embodiment of the disclosed technology, the updater 211 may change the corresponding workload parameter for each reference time, and thus the usage pattern manager 221 may change the first period or the second period for each reference time.

In other embodiments of the disclosed technology, the performance manager 220 may control the background operation of the memory device in a cycle corresponding to the workload parameter based on the workload parameter. The performance manager 220 may limit the background operation during a period determined based on the workload parameters. For example, the performance manager 220 may limit the background operation of the memory device during a period corresponding to a workload parameter equal to or greater than a preset reference value. The performance manager 220 may adjust the extent to which the background operation is limited in proportion to the values of the workload parameters.

Figure 9:
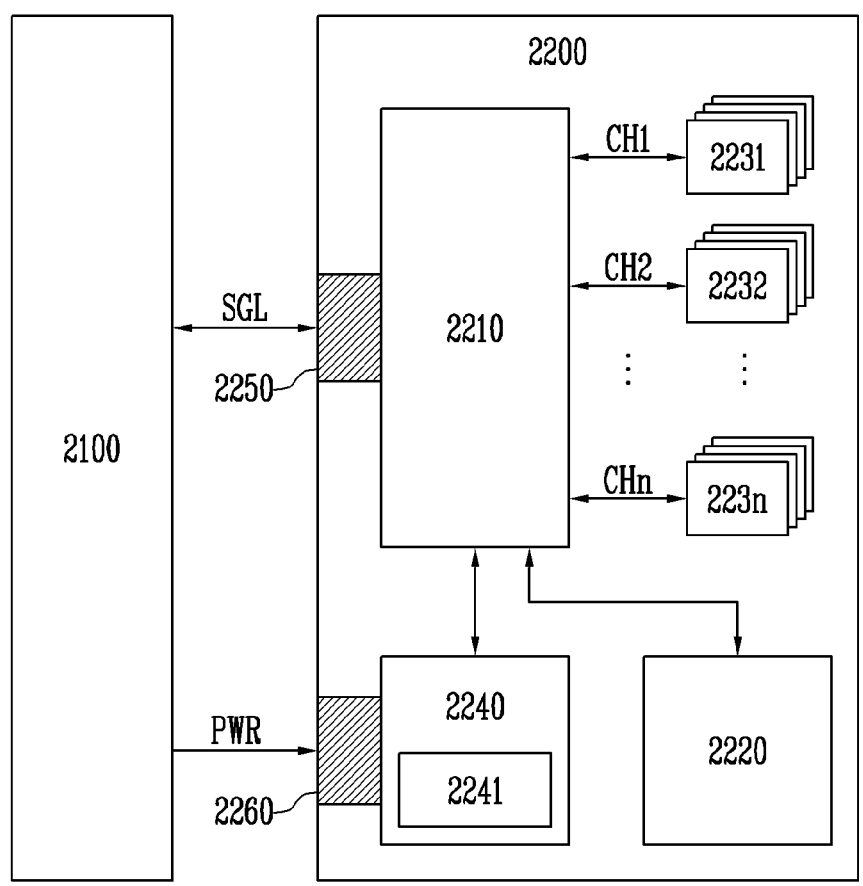
FIG. 9 is a diagram illustrating an example of a data processing system including a solid state drive according to an embodiment of the disclosed technology.

FIG. 9 is a diagram illustrating an example of a data processing system including a solid state drive (SSD) according to an embodiment of the disclosed technology.

Referring to FIG. 9, a data storage system 2000 may include a host device 2100 and an SSD 2200.

The SSD 2200 may include a controller 2210, a buffer memory device 2220, nonvolatile memories 2231 to 223n, a power supply 2240, a signal connector 2250, and a power connector 2260. The controller 2210 may control the overall operation of the SSD 2200.

The buffer memory device 2220 may temporarily store data to be stored in the nonvolatile memories 2231 to 223n. Further, the buffer memory device 2220 may temporarily store data read from the nonvolatile memories 2231 to 223n. The data temporarily stored in the buffer memory device 2220 may be transmitted to the host device 2100 or the nonvolatile memories 2231 to 223n under the control of the controller 2210.

The nonvolatile memories 2231 to 223n may be used as storage media of the SSD 2200. The nonvolatile memories 2231 to 223n may be coupled to the controller 2210 through a plurality of channels CH1 to CHn, respectively. One or more nonvolatile memories may be coupled to one channel. The nonvolatile memories coupled to each channel may be coupled to the same signal bus and data bus.

The power supply 2240 may provide power PWR input through the power connector 2260 to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include large-capacity capacitors that are capable of charging the power PWR.

The controller 2210 may exchange signals SGL with the host device 2100 through the signal connector 2250. Here, the signals SGL may include commands, addresses, data, etc. The signal connector 2250 may be configured using various types of connectors depending on an interface scheme between the host device 2100 and the SSD 2200.

Figure 10:
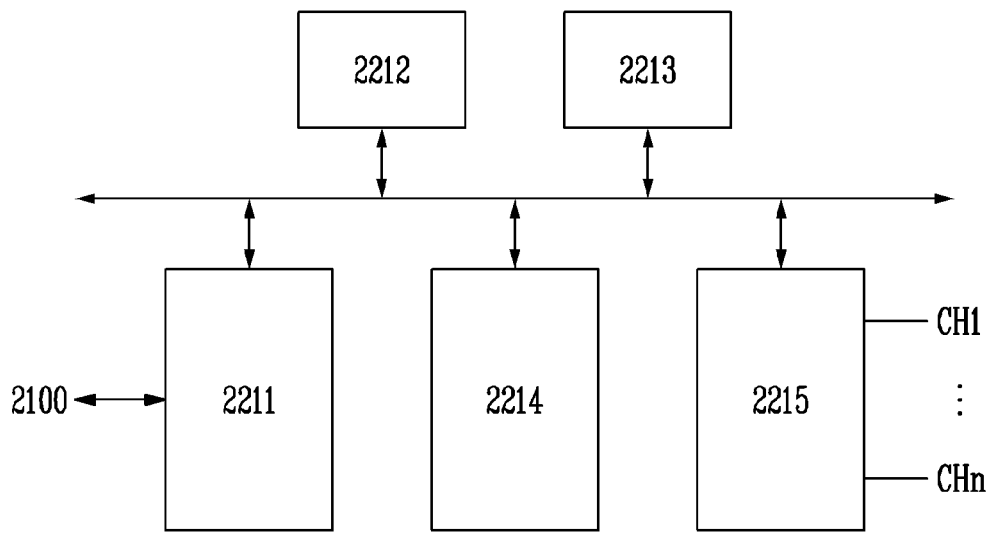
FIG. 10 is a diagram illustrating an example of the configuration of a controller of FIG. 9.

FIG. 10 is a diagram illustrating an example of the configuration of the controller of FIG. 9. Referring to FIG. 10, the controller 2210 may include a host interface 2211, a control component 2212, a random access memory 2213, an error correction code (ECC) circuit 2214, and a memory interface 2215.

The host interface 2211 may interface the host device 2100 and the SSD 2200 according to the protocol of the host device 2100. For example, the host interface 2211 may communicate with the host device 2100 through any one of interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E), and universal flash storage (UFS). Further, the host interface 2211 may perform a disk emulation function of supporting interface so that the host device 2100 recognizes the SSD 2200 as a general-purpose data storage device, for example, a hard disc drive (HDD).

The control component 2212 may analyze and process the signal SCL received from the host device 2100. The control component 2212 may control the operations of internal function blocks according to firmware or software for driving the SSD 2200. The random access memory 2213 may be used as a working memory for running the firmware or software.

The error correction code (ECC) circuit 2214 may generate the parity data of data to be transmitted to the nonvolatile memories 2231 to 223n. The generated parity data may be stored together with the data in the nonvolatile memories 2231 to 223n. The error correction code (ECC) circuit 2214 may detect error in data read from the nonvolatile memories 2231 to 223n based on the parity data. If detected error falls within a correctable range, the error correction code (ECC) circuit 2214 may correct the detected error.

The memory interface 2215 may provide control signals such as commands and addresses to the nonvolatile memories 2231 to 223n under the control of the control component 2212. The memory interface 2215 may exchange data with the nonvolatile memories 2231 to 223n under the control of the control component 2212. For example, the memory interface 2215 may provide the data stored in the buffer memory device 2220 to the nonvolatile memories 2231 to 223n, or may provide the data read from the nonvolatile memories 2231 to 223n to the buffer memory device 2220.

Figure 11:
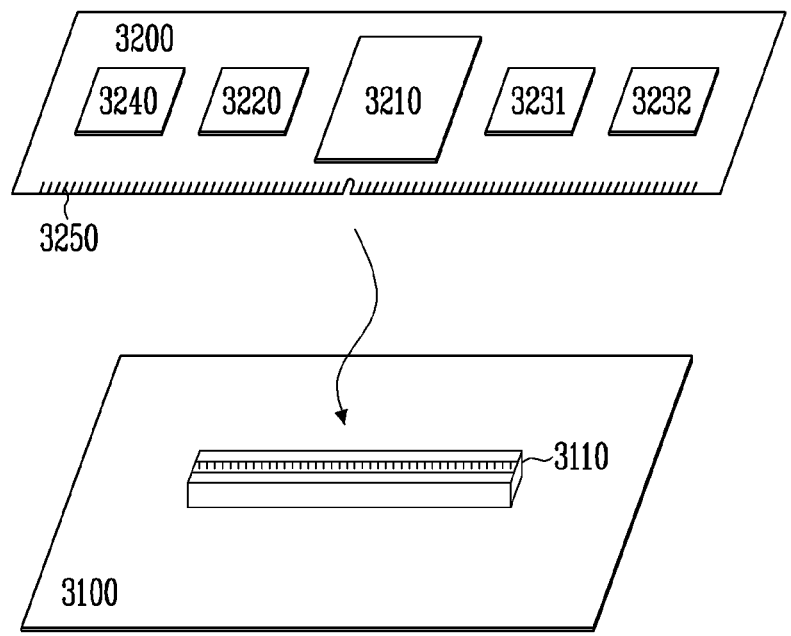
FIG. 11 is a diagram illustrating an example of a data processing system including a data storage device according to an embodiment of the disclosed technology.

FIG. 11 is a diagram illustrating an example of a data processing system including a data storage device according to an embodiment of the disclosed technology. Referring to FIG. 11, a data processing system 3000 may include a host device 3100 and a data storage device 3200.

The host device 3100 may be configured in the form of a board, such as a printed circuit board. Although not shown in the drawing, the host device 3100 may include internal function blocks for performing the function of the host device.

The host device 3100 may include a connection terminal 3110 such as a socket, a slot or a connector. The data storage device 3200 may be mounted on the connection terminal 3110.

The data storage device 3200 may be configured in the form of a board such as a printed circuit board (PCB). The data storage device 3200 may be referred to as a memory module or a memory card. The data storage device 3200 may include a controller 3210, a buffer memory device 3220, nonvolatile memories 3231 and 3232, a power management integrated circuit (PMIC) 3240, and a connection terminal 3250.

The controller 3210 may control the overall operation of the data storage device 3200. The controller 3210 may have the same configuration as the controller 2210 illustrated in FIG. 10.

The buffer memory device 3220 may temporarily store data to be stored in the nonvolatile memories 3231 and 3232. Further, the buffer memory device 3220 may temporarily store data read from the nonvolatile memories 3231 and 3232. The data temporarily stored in the buffer memory device 3220 may be transmitted to the host device 3100 or the nonvolatile memories 3231 and 3232 under the control of the controller 3210.

The nonvolatile memories 3231 and 3232 may be used as storage media of the data storage device 3200.

The PMIC 3240 may provide power input through the connection terminal 3250 to the inside of the data storage device 3200. The PMIC 3240 may manage the power of the data storage device 3200 under the control of the controller 3210.

The connection terminal 3250 may be coupled to the connection terminal 3110 of the host device 3100. Signals such as commands, addresses, and data and power may be transferred between the host device 3100 and the data storage device 3200 through the connection terminal 3250. The connection terminal 3250 may be configured in various forms according to an interfacing method between the host device 3100 and the data storage device 3200. The connection terminal 3250 may be arranged on any one side of the data storage device 3200.

Figure 12:
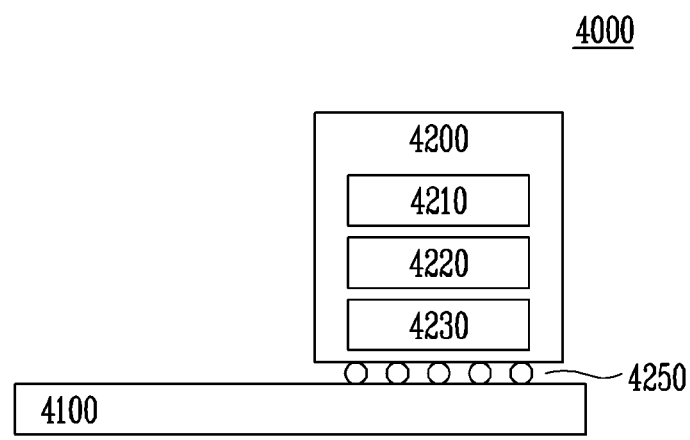
FIG. 12 is a diagram illustrating an example of a data processing system including a data storage device according to an embodiment of the disclosed technology.

FIG. 12 is a diagram illustrating an example of a data processing system including a data storage device according to an embodiment of the disclosed technology. Referring to FIG. 12, a data processing system 4000 may include a host device 4100 and a data storage device 4200.

The host device 4100 may be configured in the form of a board, such as a printed circuit board. Although not shown in the drawing, the host device 4100 may include internal function blocks for performing the function of the host device.

The data storage device 4200 may be configured in the form of a surface mount package. The data storage device 4200 may be mounted on the host device 4100 through solder balls 4250. The data storage device 4200 may include a controller 4210, a buffer memory device 4220, and a nonvolatile memory 4230.

The controller 4210 may control the overall operation of the data storage device 4200. The controller 4210 may have the same configuration as the controller 2210 illustrated in FIG. 10.

The buffer memory device 4220 may temporarily store data to be stored in the nonvolatile memory 4230. Further, the buffer memory device 4220 may temporarily store data read from the nonvolatile memory 4230. The data temporarily stored in the buffer memory device 4220 may be transmitted to the host device 4100 or the nonvolatile memory 4230 under the control of the controller 4210.

The nonvolatile memory 4230 may be used as a storage medium of the data storage device 4200.

Figure 13:
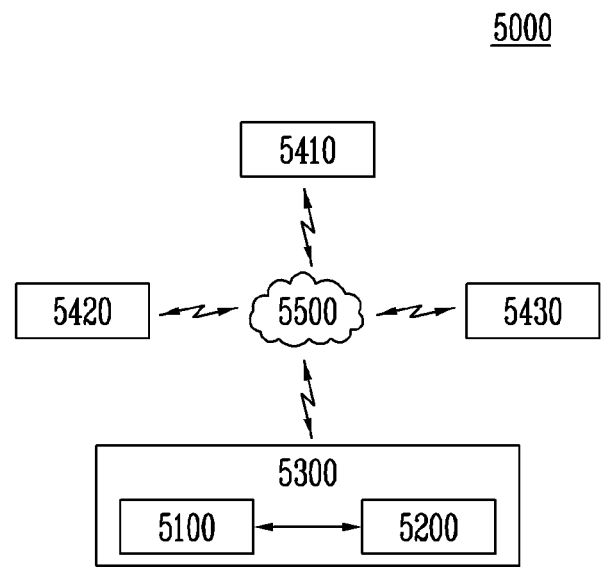
FIG. 13 is a diagram illustrating an example of a network system including a data storage device according to an embodiment of the disclosed technology.

FIG. 13 is a diagram illustrating an example of a network system including a data storage device according to an embodiment of the disclosed technology. Referring to FIG. 13, a network system 5000 may include a server system 5300 and a plurality of client systems 5410 to 5430 which are coupled through a network 5500.

The server system 5300 may serve data in response to requests received from the plurality of client systems 5410 to 5430. For example, the server system 5300 may store data provided from the plurality of client systems 5410 to 5430. In an example, the server system 5300 may provide data to the plurality of client systems 5410 to 5430.

The server system 5300 may include a host device 5100 and a data storage device 5200. The data storage device 5200 may be implemented as the memory device 100 of FIG. 1, the SSD 2200 of FIG. 9, the data storage device 3200 of FIG. 11, or the data storage device 4200 of FIG. 12.

In accordance with some implementations of the disclosed technology, there can be provided a memory system for improving the performance of a memory device and predicting the lifetime of the memory device, and a method of operating the memory system.

The embodiments described above should be understood to be exemplary rather than restrictive in all aspects. Various modifications and enhancements of the disclosed embodiments and other embodiments can be made based on what is disclosed in this patent document.

What is claimed is:

1. A method of operating a memory controller, the memory controller controlling a memory device, the method comprising:
    generating a plurality of time slots;
    acquiring data amount information of a memory device based on data written to the memory device or read from the memory device, the data amount information corresponding to the plurality of time slots;
    calculating workload parameters indicating differences between the data amount information and a reference data amount that is preset for the memory device;
    storing the workload parameters respectively corresponding to the plurality of time slots; and
    controlling whether to perform a certain background operation of the memory device performed in each of the plurality of time slots based on the workload parameters.

2. The method of claim 1, wherein the controlling allows the certain background operation to perform when a corresponding workload parameter is less than a preset reference value and disallows the certain background operation when the corresponding workload parameter is equal to or greater than the preset reference value.

3. A memory controller for controlling a memory device, the memory controller comprising:
    a workload parameter table configured to store a plurality of workload parameters corresponding to a plurality of time slots, respectively, the plurality of time slots being included in a first period, wherein the plurality of workload parameters represents an amount of written data in the memory device during a first preset time corresponding to the plurality of time slots, respectively,
    wherein the memory controller is configured to disallow, during a first portion of a second period followed after the first period, to perform a background operation, and
    wherein the first portion of the second period corresponds to time slots in which workload parameters exceeding a reference value among the plurality of workload parameters are stored.

4. The memory controller according to claim 3, wherein the memory controller is configured to determine the plurality of workload parameters by dividing the amount of write data by a reference write amount.

5. The memory controller according to claim 3, wherein the memory controller is configured to determine the plurality of workload parameters by dividing a difference between the amount of write data and a reference write amount by the reference write amount.

6. The memory controller according to claim 3, wherein the memory controller is configured to determine additional workload parameters representing an amount of written data in the memory device during a second preset time corresponding to a plurality of time slots, respectively, which are included in the second period and update the plurality of workload parameters based on the additional workload parameters,
    wherein the workload parameter table stores updated workload parameters.

7. The memory controller according to claim 6, wherein the memory controller is configured to update the plurality of workload parameters as a mean value of the plurality of workload parameters.

8. The memory controller according to claim 3, wherein the memory controller is configured to perform the background operation during a second portion of the second period that corresponds to time slots in which workload parameters not exceeding the reference value among the plurality of workload parameters are stored.

9. The memory controller according to claim 6, wherein the memory controller is configured to determine an amount of data to be written during a third period followed after the second period based on the plurality of workload parameters and the additional workload parameters and determine a lifetime of the memory device based on determined amount of data.

10. A method of operating a memory controller, the memory controller controlling a memory device, the method comprising:

storing a plurality of workload parameters corresponding to a plurality of time slots, respectively, the plurality of time slots being included in a first period, wherein the plurality of workload parameters represents an amount of written data in the memory device during a first preset time corresponding to the plurality of time slots, respectively;

disallowing, during a first portion of a second period followed after the first period, to perform a background operation, wherein the first portion corresponds to time slots in which workload parameters exceeding a reference value among the plurality of workload parameters are stored; and performing the background operation during a second portion of the second period that corresponds to time slots in which workload parameters not exceeding the reference value among the plurality of workload parameters are stored.

11. The method of claim 10, wherein the storing the plurality of workload parameters includes determining the plurality of workload parameters by dividing the amount of written data by a reference write amount.

12. The method of claim 10, wherein the storing the plurality of workload parameters includes determining the plurality of workload parameters by dividing a difference between the amount of written data and a reference write amount by the reference write amount.

13. The method of claim 10, further comprising:

determining additional workload parameters representing an amount of written data in the memory device during a second preset time corresponding to a plurality of time slots, respectively, which are included in the second period; and updating the workload parameters based on the additional workload parameters.

14. The method of claim 13, further comprising:

determining an amount of data to be written during a third period followed after the second period based on the workload parameters and the additional workload parameters; and determining a lifetime of the memory device based on determined the amount of data.

* * * * *